(12) United States Patent
Cyllik et al.

(10) Patent No.: US 10,495,457 B2
(45) Date of Patent: Dec. 3, 2019

(54) METHOD FOR DETERMINING A TREAD DEPTH OF A TIRE PROFILE AND CONTROL DEVICE THEREFOR

(71) Applicant: Continental Reifen Deutschland GmbH, Hannover (DE)

(72) Inventors: Adrian Cyllik, Hannover (DE); Carsten Hahn, Laatzen (DE); Michael Lehn, Celle (DE); Heiner Volk, Neustadt (DE); Joachim Welser, Neustadt (DE); Cord-Christian Neuber, Wunstorf (DE); Jenny Huynh, Hamburg (DE)

(73) Assignee: Continental Reifen Deutschland GmbH, Hannover (DE)

( * ) Notice: Subject to any disclaimer, the term of this patent is extended or adjusted under 35 U.S.C. 154(b) by 137 days.

(21) Appl. No.: 15/905,541

(22) Filed: Feb. 26, 2018

(65) Prior Publication Data

US 2018/0188025 A1    Jul. 5, 2018

Related U.S. Application Data

(63) Continuation of application No. PCT/EP2016/060625, filed on May 12, 2016.

(30) Foreign Application Priority Data

Aug. 25, 2015  (DE) .................. 10 2015 216 212

(51) Int. Cl.
  *G01M 17/02*  (2006.01)
  *G01B 21/18*  (2006.01)
  (Continued)

(52) U.S. Cl.
  CPC ............ *G01B 21/18* (2013.01); *B60C 11/246* (2013.01); *G01B 21/20* (2013.01); *G01M 17/02* (2013.01); *B60C 2019/004* (2013.01)

(58) Field of Classification Search
  CPC .. G01M 17/02; G01M 17/021; G01M 17/022; G01M 17/027; G01M 17/025;
  (Continued)

(56) References Cited

U.S. PATENT DOCUMENTS 6,339,956 B1 * 1/2002 Huinink ............... B60C 15/06
                                           152/152.1
8,371,159 B2   2/2013 Morinaga
                (Continued)

FOREIGN PATENT DOCUMENTS

JP    2007153034 A    6/2007
JP    2009061917 A    3/2009
JP    2011168211 A    9/2011

OTHER PUBLICATIONS

International search report dated Jul. 21, 2016 of international publication PCT/EP2016/060625 on which this application is based.

*Primary Examiner* — Andre J Allen
(74) *Attorney, Agent, or Firm* — David L. Cate; Gregory Adams

(57) ABSTRACT

A method is for determining a profile depth of a tire profile. The method includes at least the following steps: a) detecting an acceleration of a measurement point on a tire inner side of a vehicle tire, wherein a deviation, caused by contact of the vehicle tire with a roadway, of the acceleration of the measurement point within an observation window is detected, b) deriving at least one analytical characteristic variable which is characteristic of the profile of the detected acceleration, wherein the at least one analytical characteristic variable characterizes the non-periodic profile of the detected acceleration within one tire rotation, c) determining the profile depth in a manner dependent on the at least one analytical characteristic variable, wherein a calibration curve yields the dependency between the analytical characteristic variable and the profile depth, and the calibration (Continued)

curve assigns a profile depth to the derived analytical characteristic variable.

22 Claims, 4 Drawing Sheets

(51) Int. Cl.
*B60C 11/24* (2006.01)
*G01B 21/20* (2006.01)
*B60C 19/00* (2006.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/0493; B60C 23/04; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/0486; B60C 23/061; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 2008/0191855 A1* | 8/2008 | Fink | B60C 23/0416 340/447 |
| 2010/0186492 A1 | 7/2010 | Morinaga | |
| 2016/0033368 A1* | 2/2016 | Neau | G01M 17/027 702/34 |
| 2016/0121671 A1* | 5/2016 | Neau | G06T 17/00 703/6 |
| 2017/0334254 A1* | 11/2017 | Limbrunner | B60C 11/246 |
| 2018/0134101 A1* | 5/2018 | Cyllik | B60C 23/0466 |

* cited by examiner

METHOD FOR DETERMINING A TREAD DEPTH OF A TIRE PROFILE AND CONTROL DEVICE THEREFOR

CROSS REFERENCE TO RELATED APPLICATIONS

This application is a continuation application of international patent application PCT/EP2016/060625, filed May 12, 2016, designating the United States and claiming priority from German application 10 2015 216 212.5, filed Aug. 25, 2015, and the entire content of both applications is incorporated herein by reference.

FIELD OF THE INVENTION

The invention relates to a method for determining a profile depth of a tire profile, and to a control unit for carrying out the method.

BACKGROUND OF THE INVENTION

It is known for a tire sensor module to be arranged on a tire inner side of a vehicle tire, which tire sensor module can determine characteristic variables of the vehicle tire, for example a tire pressure or a tire temperature, and can transmit these via a radio signal to a control unit. Furthermore, a tire sensor module of the type can also detect an acceleration, wherein, in particular, a radial acceleration of the tire inner side can be determined. From the radial acceleration, it is possible not only to determine a motion state of the vehicle tire but also to draw conclusions regarding a profile depth of a tire profile of the vehicle tire, by virtue of the profile of the radial acceleration being evaluated over a time period or over a traversed rolling circumference. A disadvantage of previous evaluation methods is that the determination of the profile depth is highly inaccurate in particular in the case of a worn vehicle tire, that is, in the case of a small profile depth.

SUMMARY OF THE INVENTION

It is an object of the invention to provide a method for determining a profile depth of a tire profile, via which the profile depth of a worn vehicle tire can be determined with high accuracy and high reliability.

The object can, for example, be achieved by a method for determining a profile depth of a tire profile. The method includes the steps of: a) detecting an acceleration of a measurement point on a tire inner side of a vehicle tire, wherein a deviation, caused by contact of the vehicle tire with a roadway, of the acceleration of the measurement point within an observation window is detected; b) deriving at least one analytical characteristic variable which is characteristic of the profile of the detected acceleration, wherein the at least one analytical characteristic variable characterizes the non-periodic profile of the detected acceleration within one tire rotation; and, c) determining the profile depth in a manner dependent on the at least one analytical characteristic variable, wherein a calibration curve yields the dependency between the analytical characteristic variable and the profile depth and the calibration curve assigns a profile depth to the derived analytical characteristic variable.

It is a further object of the invention to provide a control unit for carrying out the method. The object can, for example, be achieved by a control unit including: a processor; a non-transitory computer readable storage medium having a program code stored thereon; and, the computer program code being configured, when executed by the processor, to determine a profile depth of the vehicle tire from at least one analytical characteristic variable, transmitted to the control unit in a manner dependent on a calibration curve, wherein, for this purpose, on the control unit, an assignment of the derived analytical characteristic variable to a profile depth can be performed via the calibration curve.

According to the invention, provision is accordingly made for an analytical characteristic variable which characterizes the profile of a detected acceleration to be derived, and for the analytical characteristic variable to be assigned a profile depth via a calibration curve, wherein the assignment is preferably unique, that is, the calibration curve maps the derived analytical characteristic variable uniquely onto the profile depth, such that each value of the analytical characteristic variable can be assigned exactly one value of the profile depth. A one-to-one mapping may preferably also be provided. In this way, the advantage is already achieved that an exact determination of the profile depth is possible preferably over the entire range, but in particular in the case of small profile depths. This is because the profile of the calibration curve makes it possible for the analytical characteristic variable derived from a measurement to be assigned to exactly one profile depth.

For the determination of the analytical characteristic variable, firstly an acceleration of a vehicle tire at a measurement point is detected, wherein the acceleration is measured at a tire inner side in a region situated opposite a tread of the vehicle tire, preferably in a tire center or at a tire apex, such that a change in the acceleration of the measurement point caused by a deformation of the vehicle tire during the contact with a roadway can be determined. For this purpose, a tire sensor module may preferably be used which is arranged on the tire inner side or is recessed into the tire inner side, such that the acceleration of the vehicle tire at a measurement point on or in the vehicle tire can be detected.

The acceleration is in this case measured over a time period, such that, for the determination of the analytical characteristic variable, it is preferably possible for a characteristic curve versus the time to be formed, which, through analytical considerations, yields the analytical characteristic variable. The characteristic curve may alternatively also be specified in terms of the traversed rolling circumference or in terms of the traversed angle of the tire sensor module or of the measurement point during a rotation of the tire through a particular angle. It is however alternatively also possible for the analytical characteristic variable to be derived directly from the detected acceleration, for example, in an electronic circuit implemented in hardware form, for example, by virtue of values of the detected acceleration being compared, without resorting to a characteristic curve.

The observed time period or the traversed rolling circumference or the traversed angle are selected such that at least one deviation in the acceleration at the tire inner side, which arises owing to the contact of the vehicle tire with the roadway and the resulting deformation of the vehicle tire, is detected by the measurement point. Thus, the acceleration is detected within an observation window in which a radius of curvature of the tire inner side of a rotating vehicle tire deviates, as a result of the contact of the vehicle tire with the roadway, from a radius of curvature of a non-deformed vehicle tire. This deviation in the radius of curvature and thus in the acceleration occurs in particular from the run-in of the vehicle tire into a tire contact patch to the run-out of the vehicle tire out of the tire contact patch, wherein the radius of curvature also changes in a transition region shortly before the run-in and shortly after the run-out, in which the vehicle tire does not make contact with the roadway. Here, the tire contact patch is to be understood to mean a ground contact area, such that a region is selected which is slightly larger than the ground contact area. The entire region composed of tire contact patch or ground contact area and transition region will hereinafter be referred to as tire contact patch region.

The observation window may in this case be selected such that only a particular range of the deviation in the acceleration, or else the entire range of the deviation over the entire contact patch region, is measured.

From the detected acceleration in the observation window, an analytical characteristic variable which characterizes the profile of the detected acceleration is derived through analytical considerations. Here, an analytical characteristic variable is to be understood within the context of the invention to mean, for example, a change in the profile of the detected acceleration within the tire contact patch region and, here, preferably a maximum positive change or a maximum negative change, that is, in the characteristic curve, respectively a maximum positive gradient or a maximum negative gradient—that is, the mathematically minimum gradient. Furthermore, an analytical characteristic variable may be understood to mean a maximum or a minimum acceleration within the tire contact patch region, that is, in the characteristic curve, a maximum ordinate value (high point) or a minimum ordinate value (low point), or else a time interval or an angular interval or a distance difference along the rolling circumference, that is, an angle or distance covered by the measurement point on the rolling circumference, that is, in the characteristic curve, an x-axis spacing between two observation points.

Thus, according to an aspect of the invention, the non-periodic behavior of the detected acceleration within a tire contact patch region yields the analytical characteristic variable, which characterizes the profile of the detected acceleration or the profile of the characteristic curve, that is, periodic characteristics such as for example natural vibrations, harmonic vibrations or disturbance vibrations remain disregarded in the calculation of the profile depth.

To obtain a mathematically unique mapping, the calibration curve that assigns a profile depth to the derived analytical characteristic variable runs preferably in monotonous fashion. It is preferable here for a linear or approximately linear calibration curve to be provided, which may emerge for example from a linear approximation to or interpolation of previously determined discrete measurement values. Here, approximately linear is to be understood to mean that the observed calibration curve runs within a tolerance band around the linear approximation to the observed calibration curve. Here, the tolerance band corresponds to an upward and downward deviation of less than 15%, preferably 5%, from the linearly approximated calibration curve. Thus, in particular, a very widely open parabola or an exponential profile which rises with a shallow gradient are also encompassed, which can each be linearly approximated without an upward or downward deviation of more than 15%, preferably 5%, from the original profile over the observed range of the profile depth.

Depending on the calibration curve, either an absolute profile depth or a change in the profile depth may be determined. In the case of an absolute determination of the profile depth, the exact profile of the calibration curve, that is, in particular the gradient thereof and the point of intersection thereof with the y axis, and possibly an initial profile depth, which may be stored for example on a control unit or on the tire sensor module for example in the event of a tire change, are relevant, whereas the knowledge of only the gradient of the calibration curve is sufficient for the determination of the change of the profile depth.

Since a linear or at least approximately linear calibration curve is used, the profile depth can be determined with the same accuracy in the entire range. A determination of the profile depth with high accuracy is thus advantageously possible even in the case of almost worn-out vehicle tires, because a change in the analytical characteristic variable can be assigned an adequately resolvable change in the profile depth, specifically preferably over the entire range of the profile depth, but in particular in the case of very small profile depths, which are relevant for example from the aspect of safety laws. It is thus possible to output a profile-depth-dependent warning with very high accuracy and reliability in the case of almost worn-out tires.

The respective calibration curve may preferably be determined in advance for each tire type and preferably stored in a control unit, such that, after the determination of the analytical characteristic variable, a conversion to the profile depth can take place preferably in the control unit. It is however also possible for the calibration curve to be determined for the first time during travel.

For the determination of the analytical characteristic variable, use may be made of various methods, wherein each method is preferably based on in each case at least one calibration curve which yields the relationship between the determined analytical characteristic variable and the profile depth.

In a first embodiment or method, provision is made for the profile of a detected radial acceleration to be observed, which can preferably be specified in a characteristic curve which specifies the radial acceleration measured at the measurement point plotted versus the time or the traversed rolling circumference or the traversed angle of the measurement point. In the profile of the detected radial acceleration or in the characteristic curve that characterizes the profile, an observation point is placed preferably on the point of the characteristic curve with the maximum positive gradient and/or the maximum negative gradient within the tire contact patch region. The observation window is in that case thus selected such that at least the maximum positive change and/or the maximum negative change of the acceleration within a tire contact patch region are detected.

The change of the acceleration or of the gradient of the characteristic curve at the observation point, that is, preferably the maximum positive change of the radial acceleration or gradient of the characteristic curve, or the maximum negative change of the radial acceleration or gradient of the characteristic curve, within the tire contact patch region, thus yields the analytical characteristic variable. To obtain a positive value for the profile depth, either the magnitude of the change of the radial acceleration or of the gradient of the characteristic curve or the magnitude of the calculated profile depth is observed, or else the calibration curve is selected such that a positive value for the profile depth is assigned to a for example negative change of the radial acceleration or gradient of the characteristic curve. Whether the point with the maximum positive or the maximum negative change or gradient is selected as observation point may for example depend on the signal quality or else the profile of the calibration curve for a particular tire type.

For the determination of the maximum positive and the maximum negative gradient, it is advantageously possible for a derivative, for example a numerically or analytically determined derivative, of the characteristic curve with respect to the time or the traversed rolling circumference or the traversed angle to be formed. The ordinate value of the high point and of the low point of the derivative respectively yields the value of the maximum positive and the maximum negative gradient of the characteristic curve. Here, it is also possible for the derivative or the change of the radial acceleration to be analyzed, without a characteristic curve being formed, directly from the detected radial acceleration, for example, via electronic circuits.

As analytical characteristic variable, the thus determined value of the maximum positive or of the maximum negative gradient or of the change of the radial acceleration is assigned a profile depth in each case via a preferably linear or approximately linear calibration curve. That is, for the maximum positive and for the maximum negative gradient of the characteristic curve or change of the radial acceleration, in each case one dedicated calibration curve is taken into consideration, which calibration curves both preferably exhibit at least an approximately linear behavior. Here, the profile of the two respective calibration curves may possibly also be identical.

Alternatively, the observation point may also be selected such that not the point of maximum negative or maximum positive change in the radial acceleration or in the gradient of the characteristic curve is observed, but rather some other arbitrary point, which lies for example slightly offset with respect to the maximum negative or maximum positive change or gradient. In that case, it may be necessary for further influences on the acceleration, for example, a wheel load, to be taken into consideration in the assignment of a profile depth.

In a second embodiment or method, a peak width of a peak in the characteristic curve in which the radial acceleration of the measurement point is plotted versus the time or the traversed rolling circumference or the traversed angle of the measurement point is observed. A peak arises within the tire contact patch region as a result of the radial acceleration falling to ideally zero at the measurement points at which the vehicle tire lies on the roadway and thus runs approximately parallel to the roadway. The peak width of the peak as an analytical characteristic variable can be assigned a profile depth via a calibration curve which is assigned to the method and which preferably runs in linear or approximately linear fashion.

The peak width can be determined by virtue of one observation point on a falling flank of the peak and a further observation point on a rising flank of the peak being selected. The difference in the abscissa values (x values) of the two observation points directly yields the peak width, wherein the same ordinate value (y value) is selected for the two observation points. Thus, in this second embodiment, the analytical characteristic variable is the x-axis spacing between two observation points, which corresponds to a time interval or an angular interval or a distance difference along the rolling circumference between two acceleration states, wherein the radial acceleration in both acceleration states is approximately identical. Thus, in this method, the observation window is selected such that, in the characteristic curve, at least the peak, formed by the falling radial acceleration and the rising radial acceleration, within a tire contact patch region is detected.

The two observation points are advantageously selected such that the two ordinate values lie at a peak height of less than approximately 25%, preferably of between 5% and 10%, or of more than approximately 75%, preferably 100%, wherein the peak height is determined from a profile averaged in weighted fashion over multiple tire rotations, and/or from a profile smoothed in accordance with the floating mean value principle, of the detected radial acceleration, such that natural vibrations or noise signals have no significant influence in the establishment of the peak height. That is, the radial acceleration at the observation points corresponds to less than 25%, preferably between 5% and 10%, or more than 75%, preferably 100%, of the radial acceleration $a_r$ the high point of the characteristic curve. In the ranges, the peak width changes most significantly in a manner dependent on the profile depth, such that the determination of the profile depth is at its most accurate in these ranges and for this second method. Here, the dependency of the profile depth on the peak width may change depending on the ordinate value of the observation points, such that a corresponding calibration curve dependent on the ordinate value is to be selected in accordance with the selection of the observation point.

In a third embodiment or method, the tangential acceleration is observed. The characteristic curve thus specifies the tangential acceleration of the measurement point versus the time or versus the traversed rolling circumference or the traversed angle of the measurement point. Within a tire contact patch region, the tangential acceleration runs through at least one high point, a zero crossing and a low point, wherein both the ordinate value at the high point and the ordinate value at the low point can be assigned a profile depth via a respective calibration curve.

That is, in this embodiment, the high point and/or the low point of the characteristic curve is selected as observation point, wherein the high point and/or the low point are preferably determined from a profile averaged in weighted fashion over multiple tire rotations, and/or from a profile smoothed in accordance with the floating mean value principle, of the detected tangential acceleration, such that natural vibrations or noise signals have no significant influence on the establishment of the high point and/or of the low point. Thus, in this third embodiment, the ordinate value of the observation points, that is, the maximum ordinate value (at the high point) and the minimum ordinate value (at the low point) of the characteristic curve within the tire contact patch region thus yields the analytical characteristic variable. Via the respective calibration curve for the third embodiment, a profile depth can be calculated from the maximum ordinate value or the minimum ordinate value, wherein one calibration curve for the ordinate value of the high point and a further calibration curve for the minimum ordinate value at the low point can be taken into consideration. Here, the profile and thus the gradient of the two respective calibration curves may possibly be identical. To obtain a positive value for the profile depth, either the magnitude of the minimum ordinate value or the magnitude of the calculated profile depth is observed, or else the calibration curve is selected such that a positive value for the profile depth is assigned to a negative minimum ordinate value at the low point.

It is alternatively also possible, for example via electrical circuits, for a maximum or minimum tangential acceleration within the tyre contact patch region to be determined directly from the detected tangential acceleration without the formation of a characteristic curve, which maximum or minimum tangential acceleration then yields the profile depth via the calibration curve.

The observation window is thus selected such that, in the characteristic curve, at least the maximum and/or minimum tangential acceleration within a tire contact patch region are detected.

It is advantageously also possible for all three methods to be implemented in parallel, for example in order to be able to perform a plausibility check on the profile depth determined via one method, or in order to be able to form a weighted mean value from profile depths calculated using different methods.

In all three embodiments, the profile of the detected acceleration or the characteristic curve can advantageously be averaged in weighted fashion. That is, profiles or characteristic curves are recorded, and averaged in weighted fashion, over multiple, for example between 10 and 10,000, tire rotations. Then, from the averaged profile or the averaged characteristic curve, the analytical characteristic variables are determined in accordance with the method. It is thereby advantageously possible for noise signals or irregularities during a tire rotation that falsify the signal to be compensated; the signal quality and thus the accuracy in the determination of the profile depth via the respective calibration curve increases. In addition or alternatively, smoothing, for example a floating mean value, may be applied in order to be able, analogously to a low-pass filter, to cut off relatively high frequency components. In this way, it is advantageously possible for the signal quality to be further improved, such that a determination of the profile depth is made more accurate.

It may advantageously furthermore be provided that, in the determination of the profile depth according to the first and the third embodiment, in each case the maximum negative change/gradient and the maximum positive change/gradient, and the maximum tangential acceleration (high point) and the minimum tangential acceleration (low point), respectively, are observed. From these, subsequently, in each case one mean value weighted in terms of magnitude is formed, which then yields the profile depth via a further, for example averaged calibration curve. In this way, it is possible for systematic errors that may be present at the respective extreme point to be avoided in the evaluation.

The evaluation of the analytical characteristic variables and thus the determination of the profile depth in accordance with three embodiments is preferably performed outside the tire sensor module. For this purpose, the tire sensor module transmits only the determined analytical characteristic variables, which are determined in the tire sensor module on the basis of the measured acceleration values, that is, in particular the tangential acceleration and/or the radial acceleration, to the control unit, in which the conversions are then performed via the calibration curves in accordance with the three embodiments, for example via corresponding software. The determination of high and low points, spacings or gradients or changes is performed here via simple processing operations, implemented using software or hardware, on the tire sensor module.

To save resources, the acceleration is advantageously detected, and processed in the tire sensor module, only over the time period or the observation window that is relevant to the respective method. In this way, the calculation can be performed more efficiently in the tire sensor module, because the acceleration outside the observation window has no influence on the calculation of the analytical characteristic variables or on the profile depth.

It is advantageously furthermore possible for a tire temperature, a tire pressure, a wheel load and/or a wheel speed to be taken into consideration, which may be transmitted to or determined in the control unit. These factors have at least a small influence on the accelerations used in the individual embodiments and thus on the profile of the characteristic curves, and may likewise be determined on the basis of the signals transmitted by the tire sensor module. The control unit can suitably compensate the influence of the factors in order to permit a more exact determination of the profile depth.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
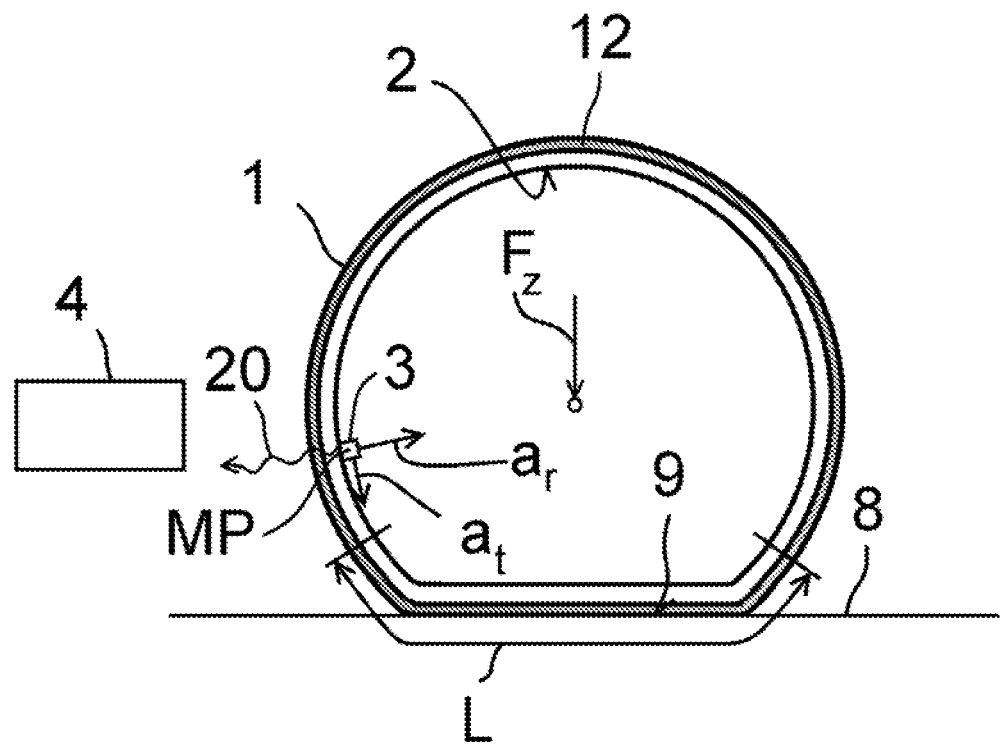
FIG. 1 shows a vehicle tire having a tire sensor module.

FIG. 1 illustrates a vehicle tire 1, on the tire inner side 2 of which there is arranged a tire sensor module 3. The tire sensor module 3 is arranged such that, via the tire sensor module 3, it is possible in particular to determine an acceleration, influenced by a deformation of the vehicle tire 1, of a measurement point MP. The acceleration may be in particular a radial acceleration $a_r$ or a tangential acceleration $a_t$ of the measurement point MP. The tire sensor module 3 can in particular transmit analytical characteristic variables, which may be derived from the measured acceleration $a_r$, $a_t$, for example, via a radio signal 20 to a control unit 4, which can correspondingly further process the radio signals 20.

Figure 2:
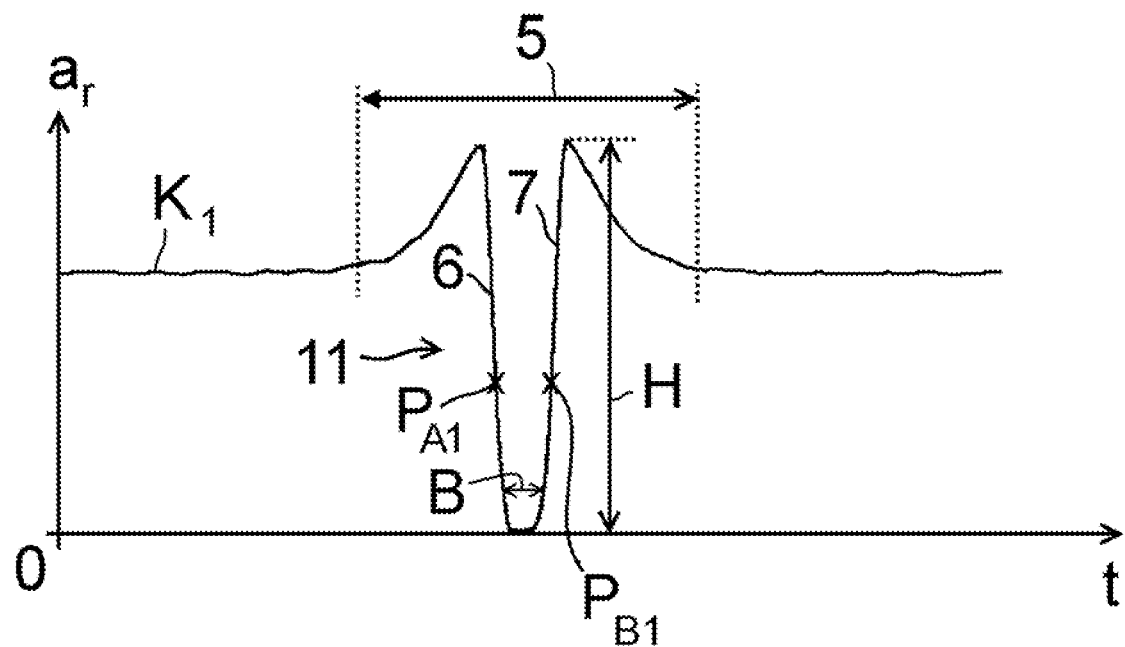
FIG. 2 shows a characteristic curve for a radial acceleration.
Figure 2A:
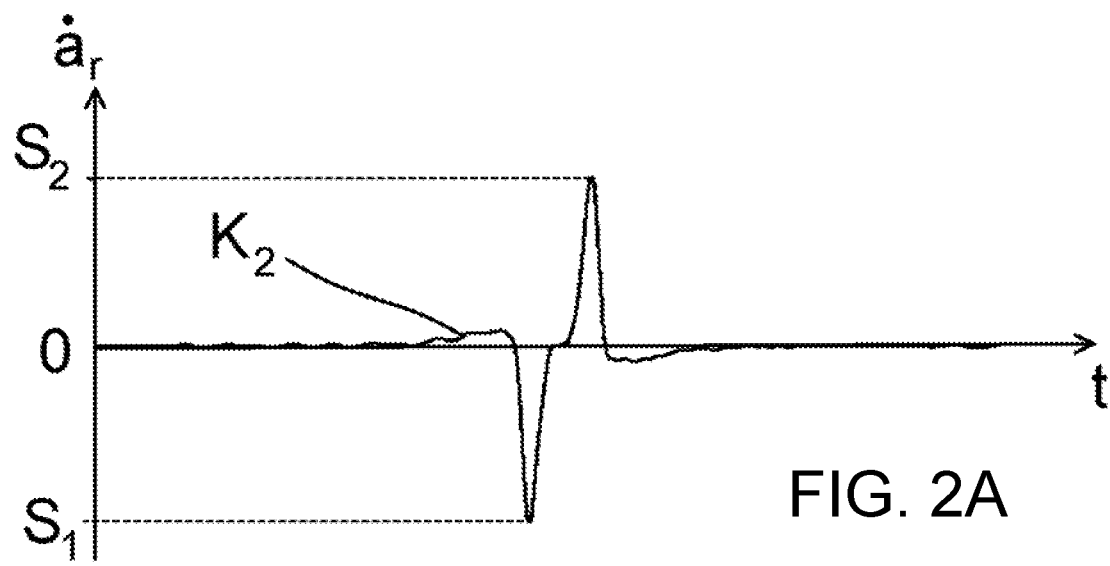
FIG. 2A shows a derivative of the characteristic curve as per FIG. 2 for the determination of a profile depth in accordance with a first embodiment.
Figure 2B:
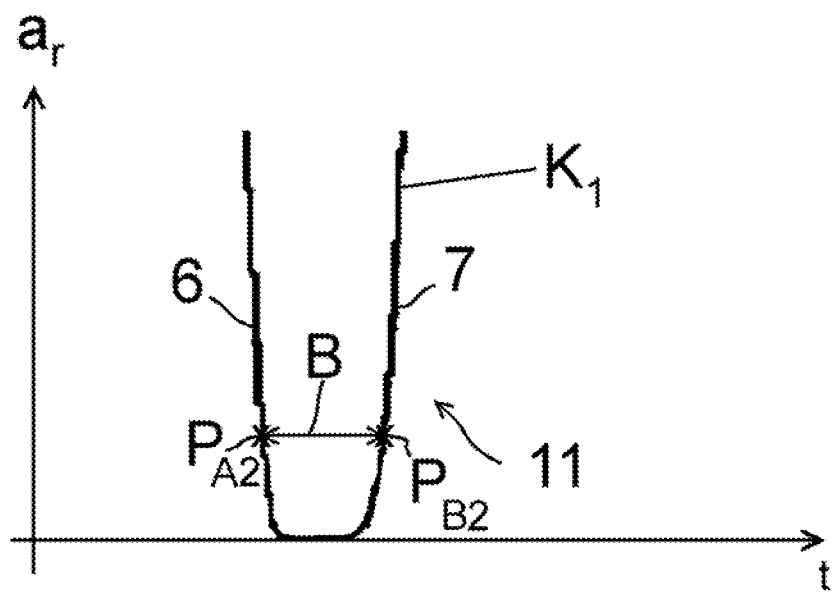
FIG. 2B shows a detail of the characteristic curve as per FIG. 2 for the determination of a profile depth in accordance with a second embodiment.

In a first and second embodiment, shown in FIGS. 2, 2A and 2B, firstly the radial acceleration $a_r$ is observed. In this regard, by way of example, FIG. 2 illustrates a characteristic curve $K_1$ in which the radial acceleration $a_r$ measured by the tire sensor module 3 is plotted versus the time t. Outside an observation window 5, the radial acceleration $a_r$ is approximately constant. Within the observation window 5, the radial acceleration $a_r$ initially rises to a high point, then has a falling flank 6 which hereafter falls approximately to zero and subsequently transitions into a rising flank 7, which rises up to a second high point. At greater time values t, the radial acceleration $a_r$ falls again to a constant value outside the observation window 5, wherein the exact profile is dependent on the orientation of the tire sensor module 3 within the vehicle tire 1. Thus, in this example, the observation window 5 corresponds to a tire contact patch region L, in which a curvature of the tire inner side 2 changes owing to the deformation of the vehicle tire 1, such that the radial acceleration $a_r$, observed at the tire inner side 2, also changes.

The radial acceleration $a_r$ becomes minimal, that is, ideally zero, when the measurement point MP is situated in the region of a ground contact area 9 of the vehicle tire 1, within which the vehicle tire 1 is in contact with a roadway 8. The vehicle tire 1 deforms in the region of the ground contact area 9 such that the tire inner side 2 runs ideally parallel to the roadway 8 in a region which is situated opposite a tread 12, lying on the roadway 8, of the vehicle tire 1; the radial acceleration $a_r$ thus ideally becomes zero at these points.

In a first embodiment, for the determination of a profile depth D of the vehicle tire 1, firstly a maximum negative gradient $S_1$ and/or a maximum positive gradient $S_2$ of the characteristic curve $K_1$ within the observation window 5 is determined, wherein the maximum negative gradient $S_1$ is assigned to the falling flank 6 and the maximum positive gradient $S_2$ is assigned to the rising flank 7. It is then preferably possible to form a derivative $K_2$ of the characteristic curve $K_1$ with respect to the time t, which derivative is illustrated in FIG. 2A. An ordinate value (y value) of a low point and of a high point of the derivative $K_2$ then yields the maximum negative gradient $S_1$ and the maximum positive gradient $S_2$ respectively.

For the further evaluation, that point of the characteristic curve $K_1$ which is assigned the lowest ordinate value in the derivative $K_2$ is selected as a first observation point $P_{A1}$, and/or that point of the characteristic curve $K_1$ which is assigned the highest ordinate value in the derivative $K_2$ is selected as a second observation point $P_{B1}$. As analytical characteristic variables, the gradients $S_1$ and $S_2$ of the first observation point $P_{A1}$ and of the second observation point $P_{B2}$ respectively are subsequently transmitted by the tire sensor module 3 to the control unit 4 via the radio signal 20, and are converted in the control unit 4, via linear or approximately linear calibration curves 10a, 10b, into the profile depth D, wherein, in this example, the magnitude of the gradient $S_1$ is observed in order to obtain a positive value for the profile depth D.

It is alternatively also possible for a maximum positive or a maximum negative change $S_1$, $S_2$ in the profile of the detected radial acceleration $a_r$ to be determined which corresponds to the gradient $S_1$, $S_2$ of the characteristic curve $K_1$ at the corresponding points, without a characteristic curve $K_1$ and a derivative $K_2$ being formed, for example, via an electronic circuit, which compares successive radial accelerations $a_r$ in an interval. The change $S_1$, $S_2$ likewise yields, via the calibration curve 10a, 10b, the profile depth D.

Figure 4:
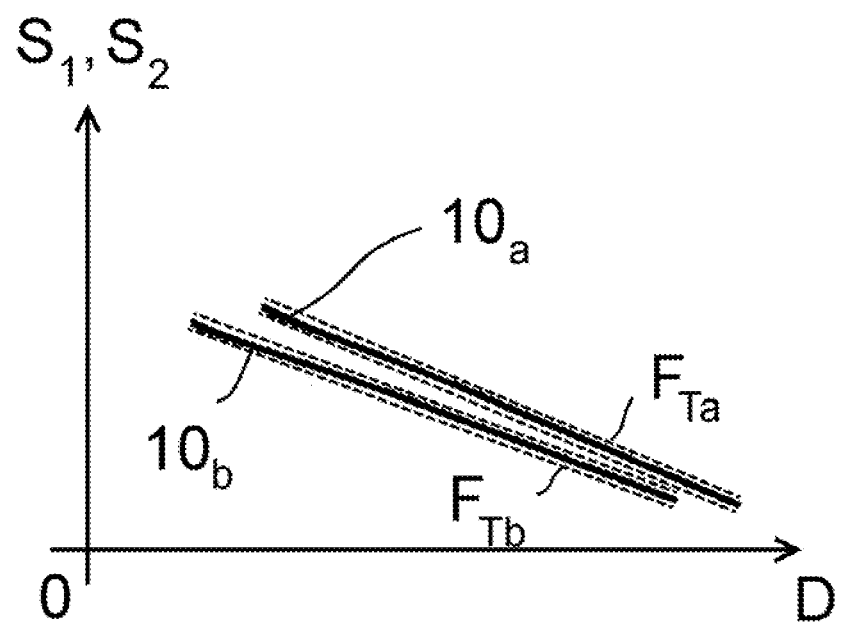

Calibration curves 10a, 10b may be stored for different tire types in the control unit 4, wherein a calibration curve 10a, 10b is stored for each analytical characteristic variable $S_1$, $S_2$, that is, a calibration curve 10a is provided for the gradient $S_1$ at the first observation point $P_{A1}$ and a calibration curve 10b is provided for the gradient $S_2$ at the second observation point $P_{B1}$; exemplary calibration curves 10a, 10b are illustrated in FIG. 4. Here, the calibration curves 10a, 10b assign a profile depth D in each case uniquely to the derived analytical characteristic variable, that is, the gradients $S_1$ and $S_2$, wherein the following applies: $D=F_a \times S_1+C_a$ and $D=F_b \times S_2+C_b$ respectively, wherein the factors $F_a$ and $F_b$ denote the gradient of the respective calibration curve 10a and 10b respectively situated within a tolerance window $F_{Ta}$ and $F_{Tb}$ respectively, and $C_a$ and $C_b$ are constants dependent on the tire type.

To avoid measurement inaccuracies, it is also possible for a mean value to be determined from the magnitude of the ordinate value $S_1$ at the low point of the derivative $K_2$ and the ordinate value $S_2$ at the high point of the derivative $K_2$ and the factors $F_a$, $F_b$, $C_a$, $C_b$, wherein the following applies: $D=(F_a \times |S_1|+F_b \times S_2)/2+(C_a+C_b)/2$.

In a second embodiment, the peak 11 formed from the falling flank 6 and the rising flank 7 is observed, wherein, using a calibration curve 10c stored for this embodiment, a peak width $B_2$ of the peak 11 illustrated in FIG. 2B yields the profile depth D. In this embodiment, the peak width B is determined at a height of approximately 5% of the peak height H, wherein the peak height is determined from a profile averaged in weighted fashion over multiple tire rotations, and/or from a profile smoothed in accordance with the floating mean value principle, of the detected radial acceleration, such that natural vibrations or noise signals have no significant influence in the establishment of the peak height of 5%. This means that an x-axis spacing, that is, a time interval, between a first observation point $P_{A2}$ and a second observation point $P_{B2}$ is formed, wherein the ordinate values of the two observation points $P_{A2}$, $P_{B2}$ correspond to a value which corresponds to approximately 5% of the peak height H; that is, the radial acceleration $a_r$ has at these points fallen to approximately 5% of the radial acceleration $a_r$ at the high points of the characteristic curve $K_1$. The peak width B yields the profile depth D as follows: $D=F_c \times B+C_c$, wherein the factor $F_c$ denotes the gradient of the calibration curve 10c situated within a tolerance window $F_{Tc}$, and $C_c$ denotes a tire-specific constant. That is, the calibration curve 10c uniquely assigns a profile depth D to the peak width B.

Figure 3:
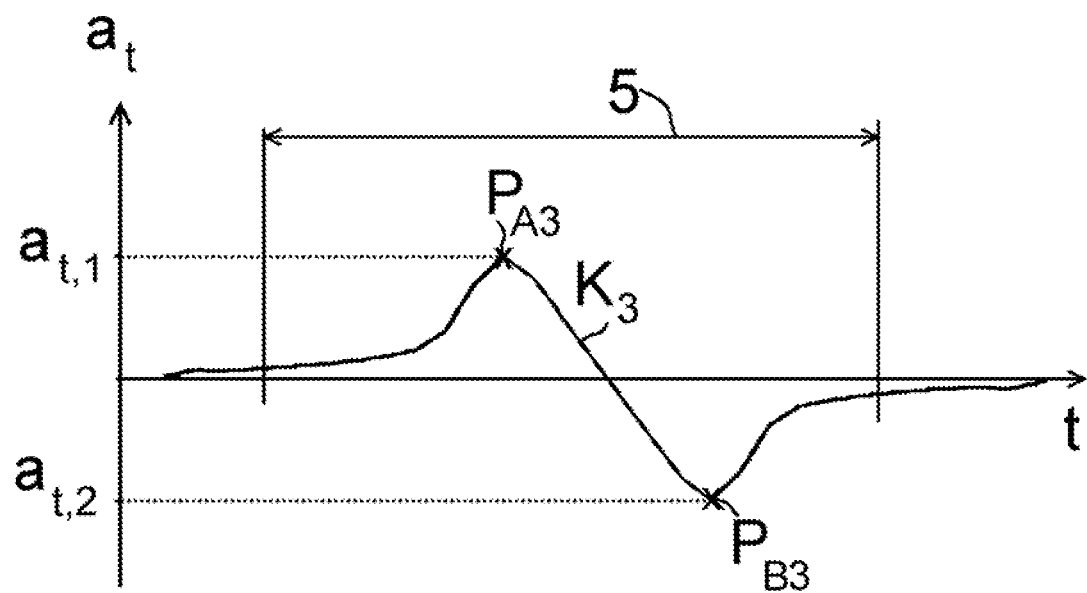
FIG. 3 shows a characteristic curve for a tangential acceleration for the determination of a profile depth in accordance with a third embodiment; and, FIG. 4 shows a calibration curve for the determination of the profile depth in accordance with the first embodiment.

In a third embodiment, which is illustrated in FIG. 3, the tangential acceleration $a_t$ versus the time t is observed and plotted as a characteristic curve $K_3$. Within the observation window 5, the tangential acceleration firstly runs through a high point, has a zero crossing and transitions into a low point, wherein the exact profile is dependent on the orientation of the tire sensor module 3 relative to the direction of rotation of the vehicle tire 1. For the determination of the profile depth D, firstly the point with the highest tangential acceleration $a_{t,1}$, that is, the high point of the characteristic curve $K_3$, is selected as a first observation point $P_{A3}$, and the point with the lowest tangential acceleration $a_{t,2}$, that is, the low point of the characteristic curve $K_3$, is selected as a second observation point $P_{B3}$, wherein the high point and the low point are determined from a profile averaged in weighted fashion over multiple tire rotations, and/or from a profile smoothed in accordance with the floating mean value principle, of the detected tangential acceleration $a_t$, such that natural vibrations or noise signals have substantially no influence in the establishment of the high point and/or of the low point. The ordinate value of the first observation point $P_{A3}$ and the magnitude of the ordinate value of the second observation point $P_{B3}$ can, via the calibration curve 10d, 10e, be uniquely assigned a profile depth D, such that the following applies: $D=F_d \times a_{t,1}+C_d$ and $D=F_e \times a_{t,2}+C_e$, wherein $F_d$ and $F_e$ denote the gradients of calibration curves 10d, 10e, which are provided for this third embodiment and which lie within the tolerance window $F_{Td}$, $F_{Te}$, for the tangential acceleration $a_t$, and $C_d$ and $C_e$ are tire-specific constants.

It is alternatively also possible for a maximum and/or minimum tangential acceleration $a_{t,1}$, $a_{t,2}$ to be determined directly from the detected tangential acceleration $a_t$, without a characteristic curve $K_3$ being formed, for example via an electronic circuit, which compares multiple successive tangential accelerations $a_t$. The maximum and/or minimum tangential acceleration $a_{t,1}$, $a_{t,2}$ likewise yields, via the calibration curve 10d, 10e, the profile depth D.

It is alternatively possible to select, as a first observation point $P_{A3}$, the high point, and as a second observation point $P_{B3}$, the low point of the characteristic curve $K_3$, and for a mean value in terms of magnitude to be formed from the two ordinate values, which yield the profile depth D, that is, $D=(F_d \times a_{t,1}+F_e \times |a_{t,2}|)/2+(C_d+C_e)/2$.

To improve the signal quality, provision may additionally be made for the characteristic curves $K_1$, $K_3$ to be averaged in weighted fashion over multiple rotations of the vehicle tire 1. In this case, the same observation window 5 is averaged in weighted fashion over for example ten rotations, and the profile depth D is determined from the averaged characteristic curve $K_1$, $K_3$ in accordance with the corresponding embodiment. In this way, it is possible in particular for noise and irregularities in the signal profile to be suppressed. Furthermore, it is also possible for a floating mean value to be applied for the purposes of smoothing the characteristic curves $K_1$, $K_3$.

To improve the accuracy, it is additionally possible for further influences on the characteristic curves $K_1$, $K_3$ to be compensated. For example, a tire pressure p, a tire temperature $T_R$, a wheel speed $v_R$ and a wheel load $F_z$ acting on the vehicle tire 1 have influences on the radial acceleration $a_r$ and the tangential acceleration $a_t$. With the knowledge of the respective influencing variables, the influences can be compensated by the control unit 4 via dependencies which are stored in the control unit 4 and which describe the influence of the tire pressure p, r of the tire temperature $T_R$, of the wheel speed $v_R$ and of the wheel load $F_z$.

It is understood that the foregoing description is that of the preferred embodiments of the invention and that various changes and modifications may be made thereto without departing from the spirit and scope of the invention as defined in the appended claims.

LIST OF REFERENCE SIGNS

1 Vehicle tire
2 Tire inner side
3 Tire sensor module
4 Control unit
5 Observation window
6 Falling flank
7 Rising flank
8 Roadway
9 Ground contact area
10a, 10b, 10c,
10d, 10e Calibration curve
11 Peak
12 Tread
20 Radio signal
$a_r$ Radial acceleration
$a_t$ Tangential acceleration
$a_{t,1}$ Minimum tangential acceleration
$a_{t,2}$ Maximum tangential acceleration
B Peak width/time interval/angular interval/distance difference
$C_a$, $C_b$, $C_c$,
$C_d$, $C_e$ Tire characteristic constants
D Profile depth
$F_a$, $F_b$, $F_c$,
$F_d$, $F_e$ Gradient of 10a, 10b, 10c, 10d, 10e
$F_{Ta}$, $F_{Tb}$, $F_{Tc}$,
$F_{Td}$, $F_{Te}$ Tolerance band of 10a, 10b, 10c, 10d, 10e
$F_z$ Wheel load
H Peak height
$K_1$, $K_3$ Characteristic curve
$K_2$ Derivative of $K_1$
L Tire contact patch region
MP Measurement point
p Tire pressure
$P_{A1,2,3}$, $P_{B1,2,3}$ Observation point
$S_1/S_2$ Change or gradient of the radial acceleration at the falling/rising flank 6/7
t Time
$T_R$ Tire temperature
$v_R$ Wheel speed

What is claimed is:

1. A method for determining a profile depth of a tire profile, the method comprising the steps of:
    a) detecting an acceleration of a measurement point on a tire inner side of a vehicle tire, wherein a deviation, caused by contact of the vehicle tire with a roadway, of the acceleration of the measurement point within an observation window is detected;
    b) deriving at least one analytical characteristic variable which is characteristic of the profile of the detected acceleration, wherein the at least one analytical characteristic variable characterizes a non-periodic profile of the detected acceleration within one tire rotation; and,
    c) determining the profile depth in a manner dependent on the at least one analytical characteristic variable, wherein a calibration curve yields the dependency between the analytical characteristic variable and the profile depth and the calibration curve assigns a profile depth to the derived analytical characteristic variable.

2. The method of claim 1, wherein the determination of the profile depth includes using a calibration curve which maps the analytical characteristic variable onto the profile depth such that each value of the at least one analytical characteristic variable is assigned exactly one value of the profile depth.

3. The method of claim 1, wherein:
    the determination of the profile depth includes using a calibration curve which runs within a linear tolerance band; and,
    the tolerance band runs with a deviation of less than 15% around a linear approximation to the calibration curve.

4. The method of claim 1, wherein:
    the determination of the profile depth includes using a calibration curve which runs within a linear tolerance band; and,
    the tolerance band runs with a deviation of less than 5% around a linear approximation to the calibration curve.

5. The method of claim 1, wherein the determination of the profile depth includes using a calibration curve which runs linearly and the profile depth is determined from a multiplication of the at least one analytical characteristic variable by a gradient of the calibration curve taking into consideration a tire characteristic constant.

6. The method of claim 1, wherein each analytical characteristic variable is assigned in each case one calibration curve.

7. The method of claim 1, wherein at least one analytical characteristic variable is derived from a change in a radial acceleration versus a time or a traversed rolling circumference or a traversed angle of the measurement point on the vehicle tire.

8. The method of claim 7, wherein a maximum negative change within a tire contact patch region or a maximum positive change within the tire contact patch region of the radial acceleration versus the time or the traversed rolling circumference or the traversed angle of the measurement point on the vehicle tire is derived as at least one analytical characteristic variable.

9. The method of claim 7, wherein a weighted average value of a maximum negative change within a tire contact patch region and a maximum positive change within a tire contact patch region of the radial acceleration versus the time or the traversed rolling circumference or the traversed angle of the measurement point on the vehicle tire is derived as at least one analytical characteristic variable.

10. The method of claim 7, wherein the derivation of the at least one analytical characteristic variable from the change of the radial acceleration includes:
forming a characteristic curve from the detected radial acceleration;
selecting at least one observation point on the characteristic curve; and,
deriving the change of the radial acceleration from the at least one observation point.

11. The method of claim 10, wherein the derivation of the change of the radial acceleration includes forming a derivative of the characteristic curve formed by the radial acceleration versus the time or the traversed rolling circumference or the traversed angle of the measurement point on the vehicle tire.

12. The method of claim 1, wherein the at least one analytical characteristic variable is derived from a tangential acceleration at the measurement point.

13. The method of claim 12, wherein a maximum tangential acceleration within a tire contact patch region or a minimum tangential acceleration within the tire contact patch region is derived as at least one analytical characteristic variable, wherein the maximum and the minimum tangential acceleration are determined from at least one of a profile of the detected tangential acceleration averaged in weighted fashion over multiple tire rotations and a profile of the detected tangential acceleration smoothed in accordance with the floating mean value principle.

14. The method of claim 12, wherein a weighted average value of a maximum tangential acceleration within the tire contact patch region and a minimum tangential acceleration within the tire contact patch region is derived as at least one analytical characteristic variable.

15. The method of claim 12, wherein the derivation of the at least one analytical characteristic variable from the tangential acceleration includes:
forming a characteristic curve versus the time or a traversed rolling circumference or a traversed angle of the measurement point on the vehicle tire from the detected tangential acceleration;
selecting at least one observation point on the characteristic curve; and,
determining the tangential acceleration from an ordinate value of the at least one observation point.

16. The method of claim 1, wherein:
a time interval or an angular interval or a distance difference along the rolling circumference between two acceleration states of the measurement point is derived from the detected acceleration as at least one analytical characteristic variable;
the detected acceleration in both acceleration states is approximately identical;
the detected acceleration in both acceleration states corresponds to a value which is less than 25% or more than 75% of a maximum detected acceleration within a tire contact patch region; and,
the maximum detected acceleration is determined from at least one of a profile of the detected acceleration averaged in weighted fashion over multiple tire rotations and a profile of the detected acceleration smoothed in accordance with the floating mean value principle.

17. The method of claim 1, wherein:
a time interval or an angular interval or a distance difference along the rolling circumference between two acceleration states of the measurement point is derived from the detected acceleration as at least one analytical characteristic variable;
the detected acceleration in both acceleration states is approximately identical;
the detected acceleration in both acceleration states corresponds to a value which is less than 5% or 100% of a maximum detected acceleration within a tire contact patch region; and,
the maximum detected acceleration is determined from at least one of a profile of the detected acceleration averaged in weighted fashion over multiple tire rotations and a profile of the detected acceleration smoothed in accordance with the floating mean value principle.

18. The method of claim 16, wherein the derivation of the at least one analytical characteristic variable from the time interval or the angular interval or the distance difference along the rolling circumference includes:
forming a characteristic curve versus the time or the traversed rolling circumference or the traversed angle of the measurement point on the vehicle tire from the detected acceleration;
selecting two observation points on the characteristic curve;
deriving a peak width of a peak in the characteristic curve from an abscissa spacing of the two observation points; and,
wherein the two observation points have the same ordinate value, and the ordinate value of the observation points corresponds to a component of a peak height of less than 25% or of more than 75%.

19. The method of claim 16, wherein the derivation of the at least one analytical characteristic variable from the time interval or the angular interval or the distance difference along the rolling circumference includes:
forming a characteristic curve versus the time or the traversed rolling circumference or the traversed angle of the measurement point on the vehicle tire from the detected acceleration;
selecting two observation points on the characteristic curve;
deriving a peak width of a peak in the characteristic curve from an abscissa spacing of the two observation points; and,
wherein the two observation points have the same ordinate value, and the ordinate value of the observation points corresponds to a component of a peak height between 5% and 10% or 100%.

20. The method of claim 1, wherein the profile of the detected acceleration is at least one of averaged in weighted fashion over multiple tire rotations and smoothed in accordance with the floating mean value principle.

21. The method of claim 1, wherein an influence of at least one of a tire pressure, a tire temperature, a wheel load and a wheel speed on the detected acceleration of the measurement point is compensated in the determination of the profile depth.

22. A control unit comprising:
a processor;
a non-transitory computer readable storage medium having a program code stored thereon; and,
said computer program code being configured, when executed by said processor, to determine a profile depth of the vehicle tire from at least one analytical characteristic variable, transmitted to the control unit in a manner dependent on a calibration curve, wherein, for this purpose, on the control unit, an assignment of the derived analytical characteristic variable to a profile depth is performed via the calibration curve.

* * * * *